United States Patent
Bill

(10) Patent No.: US 11,845,306 B2
(45) Date of Patent: *Dec. 19, 2023

(54) TIRE PRESSURE SENSOR DEVICE

(71) Applicant: Airbus Operations Limited, Bristol (GB)

(72) Inventor: Andrew Raymond Bill, Bristol (GB)

(73) Assignee: Airbus Operations Limited, Bristol (GB)

(*) Notice: Subject to any disclaimer, the term of this patent is extended or adjusted under 35 U.S.C. 154(b) by 0 days.

This patent is subject to a terminal disclaimer.

(21) Appl. No.: 17/125,381

(22) Filed: Dec. 17, 2020

(65) Prior Publication Data

US 2021/0101423 A1 Apr. 8, 2021

Related U.S. Application Data

(63) Continuation of application No. 16/232,587, filed on Dec. 26, 2018, now Pat. No. 10,875,366, which is a (Continued)

(30) Foreign Application Priority Data

Jul. 16, 2015 (GB) .................................. 151248

(51) Int. Cl.
  *B60C 23/04* (2006.01)
  *G01K 13/00* (2021.01)
(52) U.S. Cl.
  CPC ...... *B60C 23/0479* (2013.01); *B60C 23/0457* (2013.01); *B60C 23/0459* (2013.01);
  (Continued)
(58) Field of Classification Search
  CPC ............ B60C 23/0457; B60C 23/0459; B60C 23/0474; B60C 23/0479; B60C 23/0486; B60C 23/0488; G01K 13/00
  See application file for complete search history.

(56) References Cited

U.S. PATENT DOCUMENTS 5,228,337 A  7/1993 Sharpe et al.
5,335,541 A  8/1994 Sharpe
(Continued)

FOREIGN PATENT DOCUMENTS

CN  203282981   11/2013
EP  2 910 393   8/2015
(Continued)

OTHER PUBLICATIONS

Search Report in Great Britain Patent Application No. 1512488.6 dated Feb. 1, 2016.
(Continued)

*Primary Examiner* — Jill E Culler
(74) *Attorney, Agent, or Firm* — Nixon & Vanderhye P.C.

(57) ABSTRACT

A tire pressure sensor device (122) for a wheel (112) of an aircraft (102) including a pressure sensor (124) for measuring the internal pressure of a tire, a temperature sensor (126) for measuring a temperature local to the tire (116), a memory unit (131) local to the tire for storing data, and a control unit (128) local to the tire arranged to record in the memory unit (131) data of the readings taken at intervals of time. The data recorded for each reading includes an indication of the time of the reading, the tire pressure and the temperature local to the tire. Measurements may be taken and recorded over time, both when the aircraft is on the ground and when the aircraft is in flight. Data may be uploaded to a portable handheld device (140) for analysis when maintaining the tires in their correctly inflated state.

20 Claims, 5 Drawing Sheets

Related U.S. Application Data continuation of application No. 15/212,085, filed on Jul. 15, 2016, now Pat. No. 10,183,534.

(52) U.S. Cl.
CPC ...... *B60C 23/0474* (2013.01); *B60C 23/0486* (2013.01); *B60C 23/0488* (2013.01); *G01K 13/00* (2013.01)

(56) References Cited

U.S. PATENT DOCUMENTS

| | | |
|---|---|---|
| 7,259,663 B2 | 8/2007 | Ogawa |
| 8,599,044 B2 | 12/2013 | Maggiore et al. |
| 8,688,324 B2 | 4/2014 | Lhuillier |
| 9,193,225 B2 | 11/2015 | Cahill |
| 9,457,627 B1 | 10/2016 | Keller |
| 2002/0130771 A1 | 9/2002 | Osborne et al. |
| 2003/0121318 A1 | 7/2003 | Bell et al. |
| 2004/0124307 A1 | 7/2004 | Mackness |
| 2005/0061071 A1 | 3/2005 | Novikov |
| 2005/0251306 A1 | 11/2005 | Gowan et al. |
| 2006/0081697 A1 | 4/2006 | Brinton et al. |
| 2008/0055060 A1 | 3/2008 | Logan |
| 2010/0256946 A1 | 10/2010 | Carresjo et al. |
| 2010/0274441 A1 | 10/2010 | Carresjo et al. |
| 2012/0296515 A1* | 11/2012 | Boss ............... G01C 21/3453 701/423 |
| 2015/0224831 A1 | 8/2015 | Miller |

FOREIGN PATENT DOCUMENTS

| | | |
|---|---|---|
| GB | 2476335 | 5/2012 |
| WO | 01/43997 | 6/2001 |
| WO | 2013152294 | 10/2013 |
| WO | 2015/143451 | 9/2015 |

OTHER PUBLICATIONS

Crane Aerospace & Electronics, "Landing Gear Systems", (2 pages) (May 2015).
EP 16179581 Search Report (dated Aug. 12, 2016).

* cited by examiner

TIRE PRESSURE SENSOR DEVICE

RELATED APPLICATIONS

This application is a continuation of U.S. patent application Ser. No. 16/232,587 (now U.S. Pat. No. 10,875,366) filed Dec. 26, 2018, which is a continuation of U.S. patent application Ser. No. 15/212,085 (now U.S. Pat. No. 10,183,534), filed Jul. 15, 2016, which claims priority to Great Britain patent application GB 1512488.6 filed Jul. 16, 2015, the entirety of each of these applications is incorporated by reference.

BACKGROUND OF INVENTION

The present invention concerns a tire pressure sensor device, for example for an aircraft. More particularly, but not exclusively, this invention concerns a tire pressure sensor device and a method of monitoring the pressure of a tire on an aircraft. The invention also concerns an aircraft including multiple such tire pressure sensor devices, and a kit of parts including such a tire pressure sensor device.

Some modern aircraft, with landing gear assemblies, are equipped with an integrated tire pressure indicating system. Such a tire pressure indicating system includes tire pressure sensors which take tire pressure measurements which are displayed in a cockpit of the aircraft.

An integrated aircraft tire pressure monitoring system is disclosed in US-A-2008/0055060. A sensor senses an operating parameter of the tire (such as pressure or temperature), and a signal related to the sensed parameter is transmitted to a reader located on or in an aircraft fuselage. The reader may also transmit some or all of the information to another device, such as a display.

Despite the advent of integrated aircraft tire pressure monitoring systems, there are still ways in which tire pressure indicating could be improved.

Such integrated tire pressure indicating systems do not make it easy for ground crew to check tire pressure of an aircraft when performing tire pressure checks, as they are then required to board the aircraft and access the tire pressure indicating system, which may not be a trivial task.

Some aircraft do not include any integrated tire pressure measuring and indicating systems. Retro-fitting such a system is an expensive and time-consuming process.

Alternatively, tire pressures may be check manually on a tire by tire basis by means of manually attaching and using a portable pressure gauge device. Such manual checks may also be the subject of improvement.

With manual tire pressure checks, it may be difficult to make and maintain a reliable record of aircraft tire pressures. The conditions at which tire pressures are manually taken may vary. The intervals between the recording of reliable tire pressure measurements may at best be once every flight, and may in certain circumstances be less frequent. Thus, whilst tire pressures may be readily checked manually, the systematic recordal of such measurements may be difficult to implement and manage.

The present invention seeks to mitigate one or more of the above-mentioned problems. Alternatively or additionally, the present invention seeks to provide an improved tire pressure sensing device for an aircraft.

SUMMARY OF THE INVENTION

The inventor has conceived of and discloses here a tire pressure sensor device including a pressure sensor for measuring the internal pressure of a tire. The tire may, for example, be on an aircraft wheel. The device includes a locally positioned control unit arranged to record in a memory unit data in respect of multiple pressure readings over time. The control unit may be locally positioned relative to the pressure sensor. It may be that the control unit is, in use, positioned local to the tire. Both pressure sensor and control unit may form part of, or be local to, the same single device. The data recorded by the control unit in the memory unit for each such reading includes an indication of the time of the pressure reading and the pressure as measured by the pressure sensor for that pressure reading. The memory unit may also be positioned locally.

The tire pressure sensor device may also include a temperature sensor. The readings may thus include an indication of the temperature as measured by the temperature sensor. The temperature sensor may also be positioned locally. The temperature measured by the temperature sensor may be the temperature local to the tire. It is preferred that the temperature measured is indicative of the temperature of the gas in the tire. It may be that an additional or alternative temperature sensor is provided for measuring ambient temperature. The temperature sensor may be carried by the wheel on which the tire is mounted. The temperature readings may be taken at the same time as their associated pressure readings, or shortly before or after their associated pressure readings.

Thus, in accordance with certain embodiments of the invention, there is provided a single pressure sensing device for monitoring the pressure of an aircraft tire, wherein all operative parts of the device are (when in use) mounted locally to the aircraft tire, and wherein the device is configured to take and record multiple successive measurements, spaced out over a period of time (of a number of hours or days), of both pressure and temperature of the tire for subsequent analysis. Such a device can be used in relation to an aircraft that is not equipped with an integrated tire pressure monitoring system. More data can be collected than manual pressure monitoring methods can provide. Data can be acquired and recorded in a more systematic and verifiable manner than manual pressure monitoring methods can provide.

The tire pressure sensor device may include a communication module facilitating communication with a separate electronic device. The separate electronic device may be provided external to the aircraft. The separate electronic device may be a reader device. The communication between the pressure sensor device and the separate electronic device may be wireless communication, preferably secure wireless communication, for example utilising encryption of some form. The memory unit may include security key data facilitating such secure communication. The separate electronic device may be a portable device, possibly a hand-held device.

The use of a hand-held device to wirelessly obtain pressure readings, as provided in certain embodiments, allows a single ground crew member to check quickly a large number of aircraft tires without having to enter a cockpit or check the pressure of each tire manually. This may be of particular benefit in the case where the associated aircraft has no other on-board automated tire pressure indicating system.

It may be that the tire pressure sensor device includes a motion sensor. The motion sensor may be arranged to detect motion of an object from one position to another simply by means of detecting whether the object is in a given position or not. Such a motion sensor may thus merely provide a binary output. The motion sensor may be configured to indicate whether the landing gear assembly of the wheel on which the tire is mounted is deployed or stowed away. The motion sensor may be in the form of a tilt detector, which may for example be configured to indicate whether the landing gear assembly of the wheel on which the tire is mounted is deployed or stowed away. The motion sensor may be configured to detect speed of rotation of the wheel. The motion sensor may be in the form of an accelerometer, which may for example be configured to detect speed of rotation of the wheel. There may be more than one motion sensor associated with the device. There may for example be both a tilt detector and an accelerometer. The control unit may be arranged to detect, for example with the use of one or more motion sensors, at least one of (a) whether the aircraft is in flight and (b) whether the aircraft is on the ground. The control unit may be provided with a motion sensor which detects when the landing gear is stowed in which case it can be sure that the aircraft is in flight. When such a motion sensor detects that the landing gear is deployed it may not without other information be able to determine whether the aircraft is in flight or on the ground. Similarly, the control unit may be provided with a motion sensor which measures the speed of rotation of the wheel. The measure merely of the speed of rotation of the wheel will not be sufficient to determine whether the aircraft is in flight. Past measurements may also be needed to determine with confidence whether the aircraft is in flight or on the ground. Having a device which can itself ascertain whether or not the aircraft is on the ground or in flight is important because firstly the pressure readings for tires are higher in the weight-on-wheels condition, than when in flight, and secondly because requiring information to be ascertained from other systems on the aircraft would add complication. There may be benefits in the tire pressure sensor device being one that relies very little, if at all, on other systems already integrated on certain aircraft. The or each motion sensor may be provided locally, for example within a housing of the device.

It may be that the control unit is configured to record in memory both data relating to a reading taken when the aircraft is on the ground and data relating to a reading taken when the aircraft is in flight. It is preferred that the taking of at least certain readings by the control unit of tire pressure is dependent on the control unit ascertaining that the aircraft has landed or is dependent on the control unit ascertaining that the aircraft has taken-off. There may be a set delay (for example of at least ten minutes) between so ascertaining take-off or landing, and taking the measurements.

It may be that the data recorded for each such reading includes an indication of whether the aircraft is on the ground. It may be that an absence of an indication of the aircraft being on the ground can be assumed to be an indication that the aircraft is flying (but not necessarily). It may be that the data recorded for each such reading includes an indication of whether the aircraft is in flight. It may be that an absence of an indication of the aircraft being in flight can be assumed to be an indication that the aircraft is on the ground (but not necessarily). It may be that the data recorded for each such reading includes an indication of whether the aircraft is on the ground or in flight, as a binary value ("on ground" or "in flight" and no other possibility such as "not known")

It may be that the control unit is so arranged that it is effectively prevented from recording a reading for which it is not known with confidence whether the aircraft is in flight or on the ground. The control unit may for example be arranged such that, immediately after take-off, when the landing gear is still deployed and the wheels are still spinning that the control unit cannot tell with certainty what state the aircraft is in (on-ground or in-flight). There may be a pre-set time delay or other criteria for ensuring that the control unit is prevented from recording a reading without knowing whether the aircraft is in flight or on the ground. The control unit can infer such a state by monitoring wheel speed, detecting deployment or stowage of landing gear, and from historical measurements.

The memory unit may include an indication of a reference tire pressure for the tire. Such a reference tire pressure may be used to ascertain whether and when the tire is underinflated. The memory unit may include various other data, including for example a code identifying the aircraft, or other metadata. Proving details of the aircraft ID or associated reference pressure levels may enable the ground crew member to quickly and reliably check the tire pressures of a fleet containing different aircraft types, using the aforementioned separate electronic device (for example a handheld device). When such a handheld device downloads data from the memory of the sensor device, the handheld unit may be arranged to compare the reference pressure with the actual pressure and to indicate whether the actual pressure (or the trend in pressure reduction over time) is suggestive that the tire is, or soon will be, underinflated. In such a case the separate electronic device may be configured to show a warning message.

The tire pressure sensor device is may be self-contained. Whilst parts at least of the pressure and temperature sensors may need to be provided outside the main body of the device, it is preferred that the device has a housing which accommodates the input ports for receiving measurements from the pressure sensor and the temperature sensor. At least a part of the pressure sensor (for example an input port) may thus be provided inside the housing. At least a part of the temperature sensor (for example an input port) may thus be provided inside the housing. Such a housing would for example also accommodate the control unit and the memory unit. The device may include a local source of electric power, for example a battery-based power source. The device may weigh less than 500 g, preferably less than 200 g. The mass may be sufficiently low that its presence off-axis on the wheel presents no significant wheel balancing issues, in view of the total mass of the wheel including the tire. The housing may have a maximum dimension of less than 200 mm. It may be that the housing has a maximum dimension less than 100 mm.

The tire pressure sensor device may be provided on or in respect of an aircraft wheel. There is thus provided a tire pressure sensor device provided on an aircraft wheel, the device being in accordance with any aspect of the present invention as claimed or described herein, including any optional features relating thereto. It is preferred that the device is largely self-contained. All parts of the device may carried by the wheel (and may be specifically arranged and configured with that in mind). Some parts of the device may be positioned inside the tire. Some parts of the device may be provided on adjacent structure such as a wheel axle. In the case where a motion sensor detects that the landing gear is deployed or stowed, the motion sensor may be mounted on another part of the landing gear. There may be wireless communication between parts of the device to allow for some parts to be separated from (but still local to) the main housing of the device. There may be wireless communication between a sensor within the tire and the rest of the device which is mounted outside the tire. There may for example be wireless communication between a sensor within the tire and an input port (for receiving a measurement from the sensor) associated with the rest of the device which is mounted outside the tire. The invention also provides an aircraft wheel, or a landing gear assembly comprising such a wheel, which is provided with a tire pressure sensor device in accordance with any aspect of the present invention as claimed or described herein.

The tire pressure sensor device may include attachment means for attaching the device to the wheel body. The attachment means may comprise one or more parts that are arranged to engage with a recess in the wheel specifically provided for a pressure sensing device. The attachment means may be in the form of nuts and bolts. The attachment means may comprise a strap. The attachment means may facilitate clipping the device to the wheel. The attachment means may facilitate clamping the device to the wheel. The attachment means may include a threaded part that mates with a corresponding threaded part on (whether separately attached or not) the wheel. The threaded part may provide fluid communication to allow for sensing of the internal pressure. There may be a holder unit connected to the wheel, wherein the holder unit is configured to receive and accommodate the device. The holder unit may provide an interface, for example including a valve, between the device and the wheel. The holder unit may be an integrated part of the wheel. The holder unit may be removably connected to the wheel. The device may be removably attached to the wheel body via a valve that provides for fluid communication to allow for sensing of the internal pressure. There may be a separate valve integrated with the wheel allowing for inflation or deflation of the tire.

One embodiment of the invention concerns a tire pressure sensor device for a wheel of an aircraft including (a) a pressure sensor for measuring the internal pressure of a tire, (b) a temperature sensor for measuring a temperature local to the tire, (c) a memory unit local to the tire for storing data, and (d) a control unit local to the tire arranged to record in the memory unit data in respect of multiple readings over time, the data so recorded for each such reading including an indication of the time of the reading, the pressure as measured by the pressure sensor and the temperature as measured by the temperature sensor.

The present invention may be embodied, according to a second aspect, as an aircraft including multiple tire pressure sensor devices. Each such tire pressure sensor device may be associated with a different respective wheel of the aircraft. Each tire pressure sensor device may be in accordance with any aspect of the present invention as claimed or described herein, including any optional features relating thereto.

Data from multiple sensors, particular when captured in a coordinated manner, can provide extra benefits. For example, reliable data on whether a landing gear assembly is stowed or deployed may not be available on all landing gear assemblies (there may be no tilt switch provided for example), but other sensor devices may include reliable indications of when the landing gear switches between the stowed and deployed positions. In such a case such reliable indications of whether the landing gear is stowed or deployed at certain times of measuring tire pressure may be utilised in respect of the data from the sensors not including such reliable data.

There is also provided a kit of parts including a tire pressure sensor device according to any aspect of the present invention as claimed or described herein, including any optional features relating thereto. The kit may comprise a portable reader device, which may for example be configured for use externally of the aircraft. The tire pressure sensor device and the portable reader device are both configured for facilitating electronic communication, preferably wirelessly, between each other. There may be multiple such tire pressure sensor devices in the kit.

The invention may also be embodied as a method of monitoring the pressure of a tire on an aircraft, particularly (i.e. but not necessarily) using a pressure sensing device according to any aspect of the present invention as claimed or described herein, including any optional features relating thereto. There may be a step of a control unit causing first measurements to be taken of the tire pressure and, optionally, of an associated temperature. There may be a step of the control unit recording in a memory unit first data including an indication of the time at which the first measurements are taken, an indication of the tire pressure and, optionally, an indication of the temperature as so measured by the first measurements. There may be a step of the control unit causing second measurements to be taken of the tire pressure and, optionally of an associated temperature. There may be a step of the control unit recording in the memory unit second data including an indication of the time at which the second measurements are taken and an indication of the tire pressure and optionally an indication of the temperature as so measured by the second measurements. It may be that the method is so performed that one of the first and second measurements is taken when the aircraft is on the ground and the other of the first and second measurements is taken when the aircraft is in flight. It may be that the time between the first and second measurements being taken is longer than one minute, preferably more than 10 minutes. It may be that the time between the first and second measurements being taken is less than twenty-four hours, preferably less than 7.5 hours.

Optionally the in-flight pressure reading is normalised to take account for the tire being unloaded. Optionally, one or more pressure readings may be normalised to take account of temperature. Such normalisation may be carried out by the control unit, but it may be preferred in some embodiments for a separate computer device to perform such data processing tasks.

It may be that multiple successive sets of measurements are taken and corresponding multiple successive sets of data are recorded in the memory unit. The interval between successive measurements may be between 10 minutes and 7.5 hours (7.5 hours being approximately the average flight time for Airbus' A380 aircraft). The interval between successive measurements when the aircraft is in flight may be more than 1 hour. At least one set, and preferably at least two sets, of measurements are taken when the aircraft is in flight, More than three, and preferably more than ten, successive sets of measurements are taken and stored in the memory of the device. The data recording may thus span several flights.

The method may be performed over a period of time of one or more days. Data may be recorded on a rolling basis, such that data older than a certain time are overwritten with new data. There may for example be at least 72 hours of rolling data, and preferably at least 120 hours. It may during performance of the method there are a set number of data sets stored in memory, the set number being greater than 25 (optionally greater than 50) but fewer than 1,000, and possibly fewer than 250. It may be that as a new set of data is stored, the oldest set of data is deleted (effectively overwritten).

It may be that one of the first and second measurements is triggered by detection of a change in the speed of spinning, if any, of the tire. It may be that one of the first and second measurements is triggered by detection of the speed of spinning of the tire passing a threshold amount (for example falling from a higher amount via the threshold amount to a lower amount). It may be that one of the first and second measurements is taken after a set time delay dependent on the detection of the change in the speed of spinning. The set time delay may for example be a set time after the start of tire spinning is detected. The set time delay may for example be a set time after it has been ascertained that the tire has stopped spinning.

The method may include a step of wirelessly sending stored data from the control unit of the device to a handheld device, for example the above-mentioned portable reader device or other separate electronic device. The same handheld device may be used to download data from multiple tire pressure sensor devices of the invention on an aircraft, preferably all of the multiple tire pressure sensor devices. The same handheld device may be used to download data from multiple tire pressure sensor devices substantially (from the user perspective, for example) contemporaneously. The range of communication is preferable at least 10 metres and may be more than 100 m. The same handheld device may be used to download data from multiple tire pressure sensor devices of the invention on multiple aircrafts.

The method may include a step of deciding whether or not to add more gas to the tire (e.g. to further inflate the tire), the decision depending on data received by a separate electronic device, for example the above-mentioned portable reader device. The decision may be taken by the separate electronic device and be provided as an output, for example via a visual display unit of the separate electronic device. The decision may be taken taking into account one or more historical measurements, in addition to a more recent measurement (for example the last measurement taken before making the decision). The method may then include a step of inflating the tire, if so directed by the separate electronic device.

The method may include a step of deciding whether or not to replace the tire, the decision depending on data received by a separate electronic device, for example the above-mentioned portable reader device. The decision may be taken by the separate electronic device and be provided as an output, for example via a visual display unit of the separate electronic device. The decision may be taken taking into account one or more historical measurements, in addition to a more recent measurement (for example the last measurement taken before making the decision). The separate electronic device may for example detect that the tire pressure in the tire had reduced more rapidly than would be expected of a tire in good health. The method may include a step of replacing the tire, if so directed by the separate electronic device.

There may be a step of uploading data from the separate electronic device, which will typically be a portable device, to a further computer, for example a central server, so that data can be collated. Such collated data may then be used for fleet-wide analytics or archived.

When collating data from multiple tire pressure sensor devices, the data from one or more devices may be used in relation to assessing the data from one or more other devices. For example, some devices may detect with greater accuracy whether the aircraft is on the ground or not, the resulting information from which can be used to normalise pressure readings on other devices. It is preferred that all devices are of the same design, but that need not be the case. For example, different devices could be used on the main landing gear (MLG) from the nose landing gear (NLG). Not all devices need be provided with functioning motion sensors, for example.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
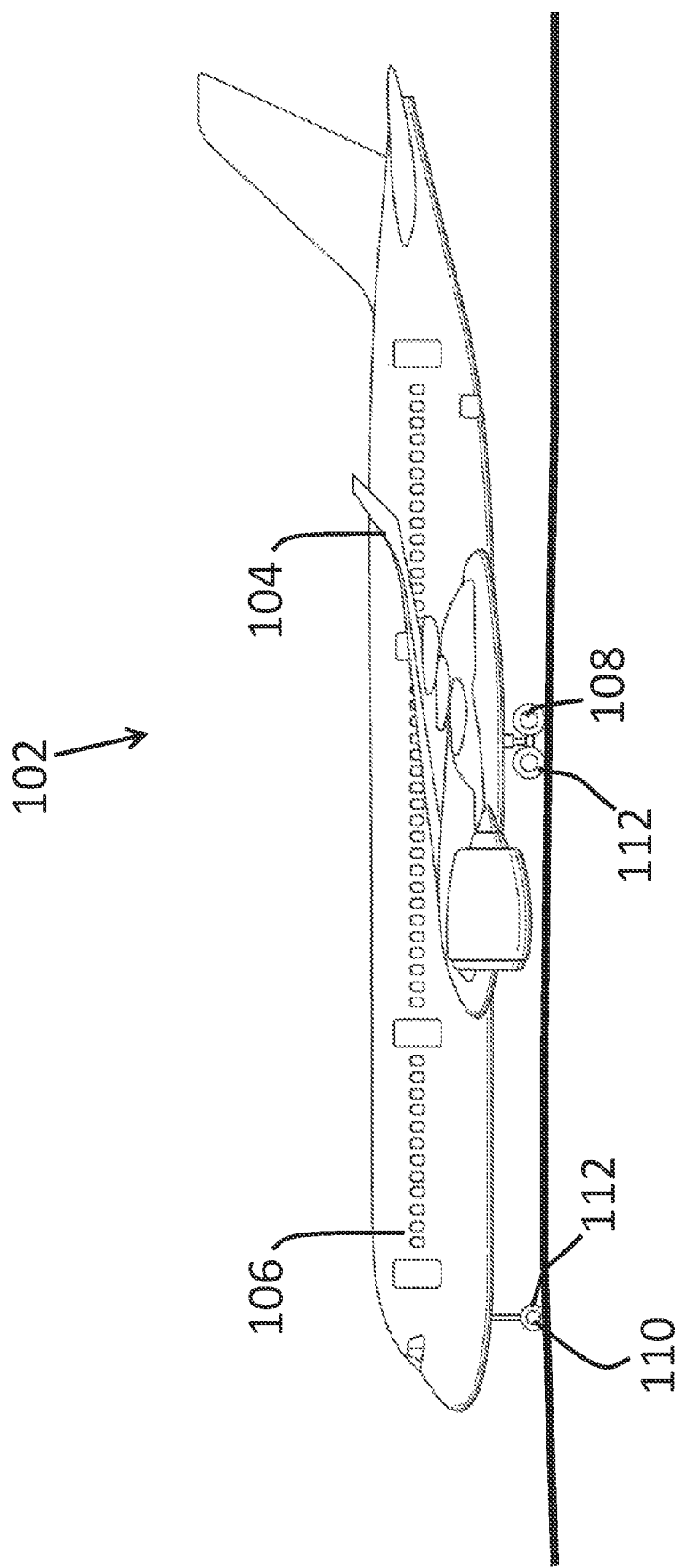
FIG. 1 shows an aircraft according to a first embodiment of the invention.
Figure 2:
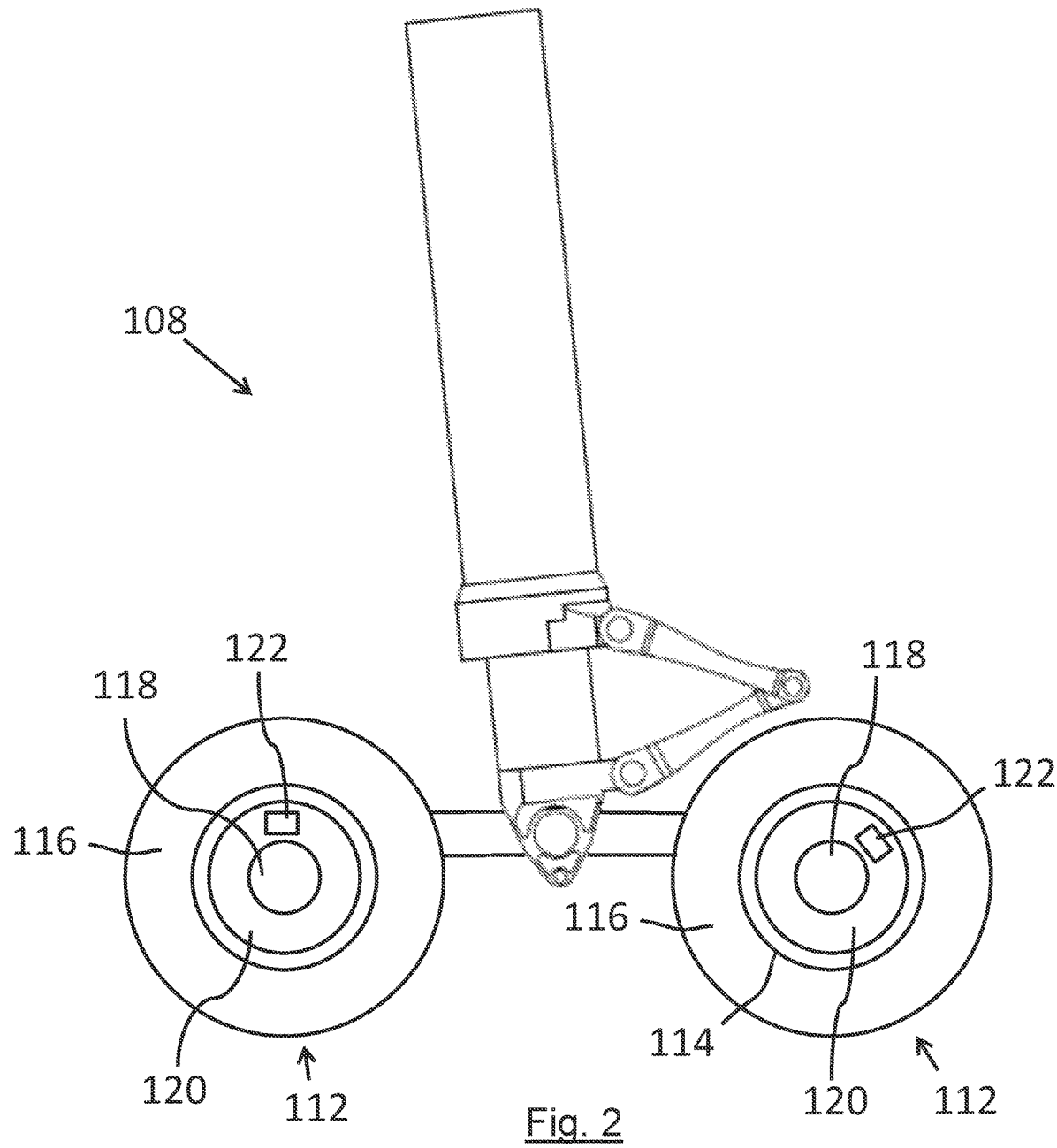
FIG. 2 shows a landing gear assembly of the aircraft of FIG. 1 showing two tires to which are attached two smart sensor devices of the first embodiment of the invention.

FIG. 1 shows an aircraft 102 comprising a pair of wings 104 and a fuselage 106. The wings each carry an engine. The aircraft 102 is supported on the ground by sets of landing gear assemblies comprising a main landing gear (MLG) 108 and a nose landing gear (NLG) 110. The landing gear assemblies comprise wheels 112 which are shown in FIG. 1 in contact with the ground (e.g. runway). The landing gear assemblies are mounted for movement between a deployed position in which the main strut of each landing gear is generally vertical and a stowed position in which the strut is generally horizontal. The MLG 108 is shown in greater detail in FIG. 2 together with a schematic illustration of the wheels 112. Parts of the landing gear 108 including, for example, the axles for mounting the wheels and the upper part of the landing gear assembly, have been omitted from FIG. 2 for the sake of clarity. Each wheel 112 comprises a rim 114 on which there is mounted a tire 116. The hub of the wheel is covered by means of a hub cover 118 (which may also function as a brake cooling fan guard, in the case where such fans are provided). On the main body 120 of each wheel 112, there is mounted a smart sensor device 122, which rotates with the wheel.

The wheel body has a port (not shown) which is configured for attachment of a pressure sensor holder, which both releasably holds the device 122 in place, and also allows the device to be attached or removed without loss of tire gas pressure. (In other embodiments the smart sensor device may be fixed to the wheel body by means of a different form of attachment or may be fixed to the wheel body directly, for example by having a threaded part which interfaces with a corresponding mating port on the wheel). There may be many wheels, each with a tire and associated smart sensor device 122, on the aircraft.

Each smart sensor device 122 has a mass of about 120 g, is generally cylindrical in shape with a diameter of about 30 mm and a length of about 90 mm.

Figure 3:
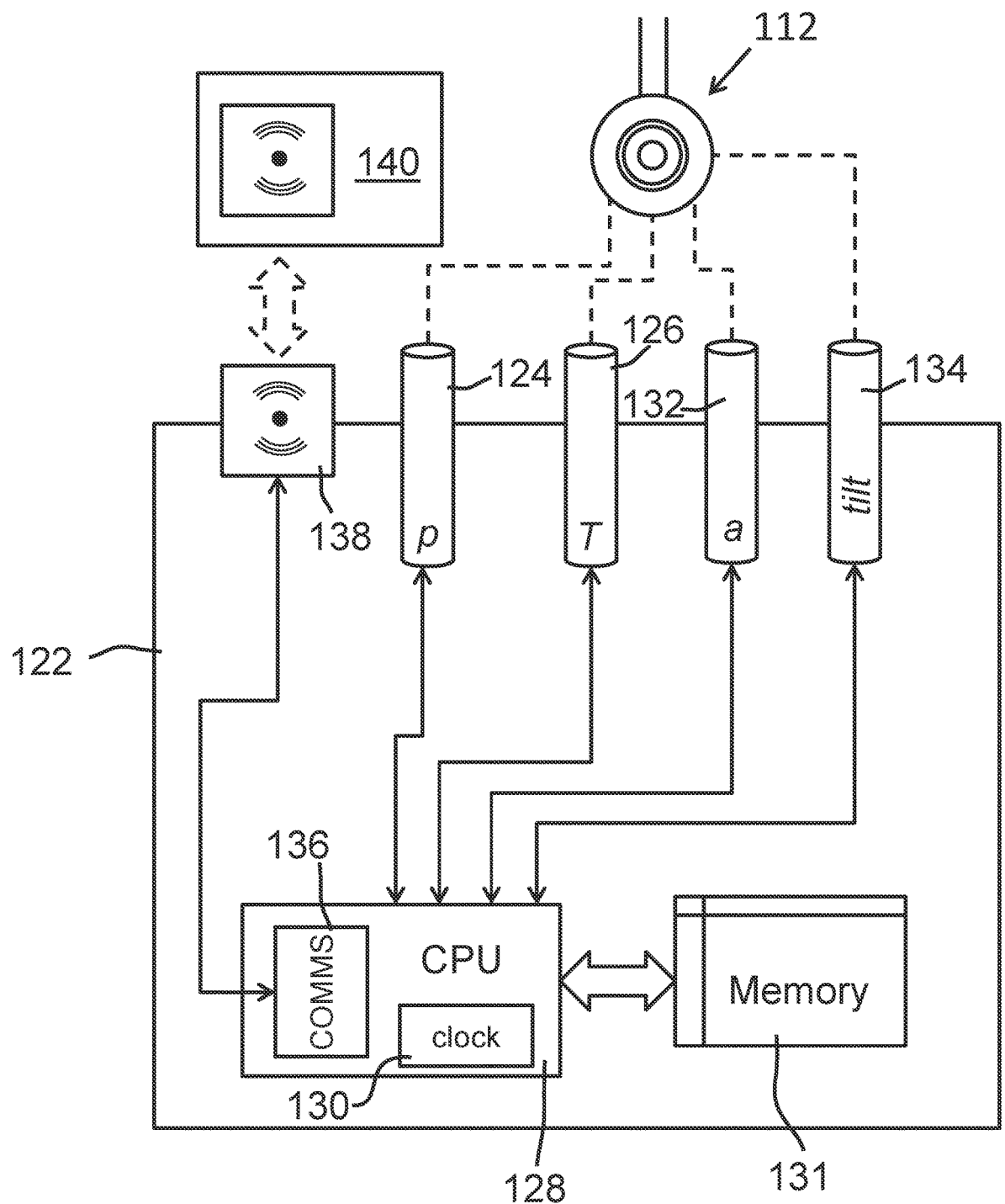
FIG. 3 shows schematically the function of the first embodiment of the invention.

The smart sensor device 122 is shown schematically in FIG. 3. The device includes a tire pressure sensor 124, which is contained within the device 122 and measures the pressure in the tire via the gas port of the wheel body to which the pressure sensor holder is connected. (In an alternative embodiment, the pressure sensor is located within the tire and connects wirelessly to the device 122.) The device also includes a tire temperature sensor 126 for measuring the temperature of the sensor-wheel interface, from which temperature the tire gas temperature may be derived. (In an alternative embodiment, the temperature sensor is located within the tire and connects wirelessly to the device 122.) The smart sensor device 122 also includes a processor (CPU 128) with an internal clock 130 and an associated memory 131.

The device 122 also includes an accelerometer 132 which can be used to ascertain the angular speed of wheel rotation and a tilt switch 134 which can be used to detect when the landing gear is moved between the deployed position and the stowed position. The processing unit 128 is integrated with a communications module 136 which, via an antenna 138, provides for wireless communication with a handheld device 140. The sensor device 122 has its own rechargeable power supply (not shown).

Each of the smart sensor devices 122 has a unique ID no. associated with it, which is stored in the memory unit 131. Also stored in the memory unit are data including the aircraft's ID number, security key data which facilitates secure encrypted wireless communication with the separate handheld device 140, and an indication of the expected tire pressure at a given temperature (a "reference pressure"). Other metadata may be stored in the memory unit 131.

Figure 4:
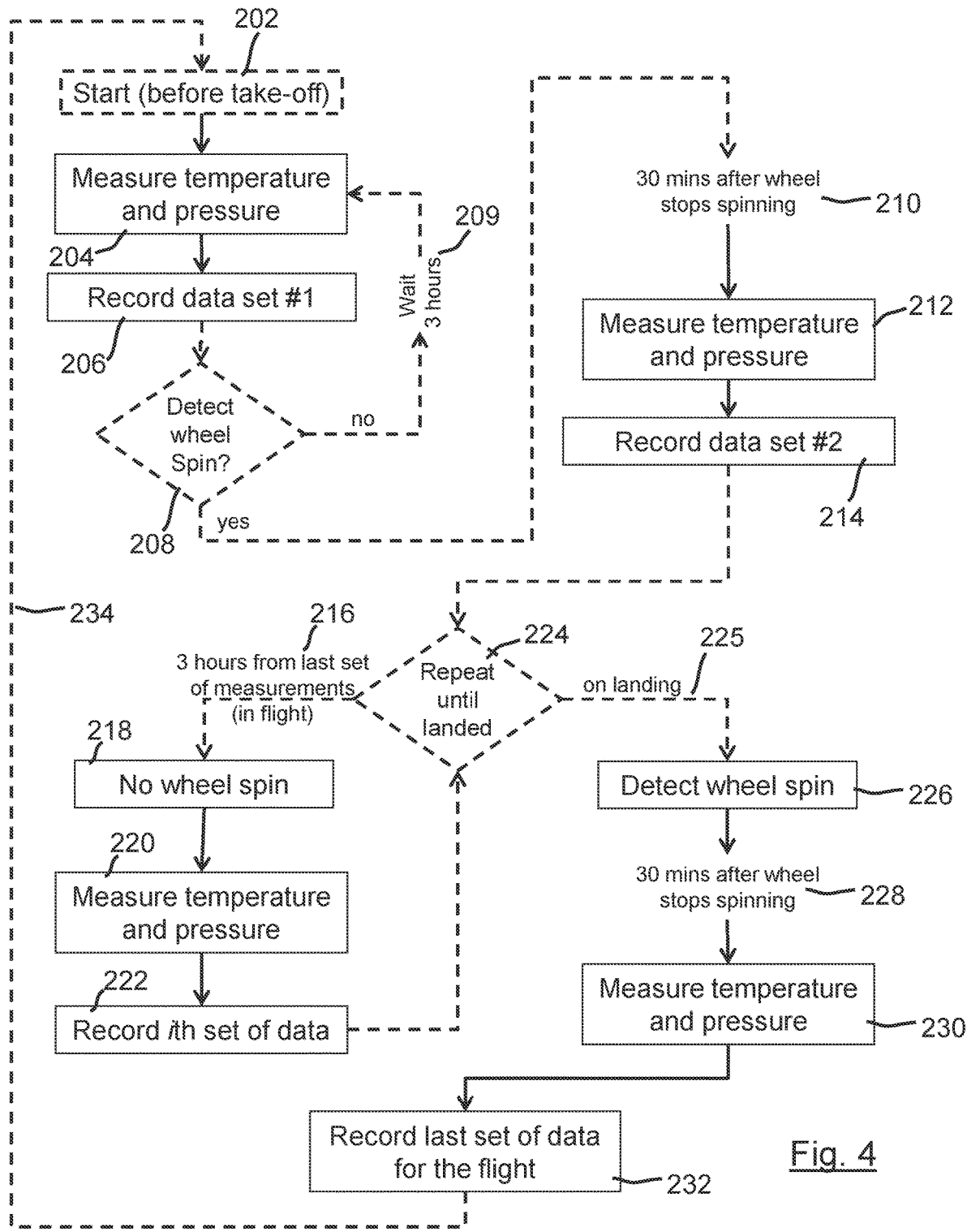
FIG. 4 is a flow chart illustrating an example method of tire pressure monitoring in accordance with a second embodiment of the invention.

Operation of multiple smart pressure sensor devices on an aircraft will now be described with reference a second embodiment of the invention. The smart sensor devices may each be in the form of a device as described above in relation to the first embodiment. All of the smart sensor devices on the aircraft operate in the same way. Operation of one of the sensor devices will now be described with reference to FIG. 4, which shows a method, according to the second embodiment, of operation of a smart pressure sensor device before take-off and an end time after subsequent landing. The sensors once installed are always powered "on" but for the sake of the present description the process will be described from an arbitrary start time 202. Thus, initially the sensor takes (step 204) an initial set of readings and stores them (step 206) in memory as a first reading. The data stored includes the time of the measurement, an indication of the temperature measured, an indication of the pressure measured, and an indication of the whether the aircraft is on the ground or in flight according to the control unit. Optionally, the tilt switch position is included in the data so recorded. For the first set of data recorded it is assumed that the aircraft is on the ground. The fact that a landing gear assembly is deployed can be verified by the control unit of the smart sensor by means of the output from the tilt switch. The device monitors (step 208) for wheel movement by monitoring the output from the accelerometer. Once the wheel has started spinning (indicated by branch labelled "yes"), the control unit monitors wheel speed (as derived from the readings of the accelerometer) to detect when take-off has completed. After take-off, the wheels will stop spinning, if for no other reason through friction. The control unit notes the time at which the wheel stops spinning, and then waits (step 210) for 30 minutes, at which point (i.e. 30 minutes after the wheel has stopped spinning) the tire pressure and temperature are measured (step 212 and the corresponding data set recorded again (step 214). With reference to FIG. 4 if, after a wait time of 3 hours (see reference numeral 209) from the start 202 of the process, no wheel movement is detected (indicated by branch labelled "no"), the device will perform a new set of measurements (box 204) and record a new set of data (box 206), and continue doing this until such time as wheel movement is detected. 30 minutes after the wheel has stopped spinning, it is assumed that the aircraft is in flight. It is likely that the landing gear assembly is stowed at this time (at least 30 minutes after take-off) and, if so, that can be verified by the control unit of the smart sensor by means of the output from the tilt switch. The reason for measuring pressure and temperature at least 30 minutes after take-off is that it is assumed that the tire will by then have returned to its steady state condition, with the temperature sensor thus accurately representing the temperature of the gas within the tire. By this time, the control unit has recorded two sets of data, one on the ground before take-off and one shortly after 30 minutes after take-off.

The control unit then records further measurements at three hourly intervals until the device detects the wheel spinning again. Thus, if three hours elapse (arrow 216) since the last reading without detecting spinning of the wheel (box 218), the control unit assumes that the aircraft is still in flight and takes a further set of measurements (step 220) and records (step 222) the ith set of data (where i is the number of the data set so recorded). This process is repeated (box 224) every 3 hours, until the control unit detects (step 226) rotation of the wheel as indicated by means of the output from the accelerometer. At this point it is assumed by the control unit that the aircraft has touched down. After the control unit has detected the spinning up of the wheel on landing (as indicated by arrow 225), the control unit monitors wheel speed (as derived from the readings of the accelerometer) to detect when landing has completed. When the aircraft has come to a rest, the control unit waits (step 228) for 30 minutes, and then measures (step 230) the tire pressure and temperature and the corresponding data set are then recorded (step 232). By this time it is hoped that the brakes will have cooled sufficiently not to significantly affect the pressure and temperature readings.

Further readings are then taken at 3 hourly intervals, and the process therefore continues (as signified by arrow 234). The data sets stored in memory are recorded on a rolling basis so that the memory unit required for storing the data can be relatively small and simple. There is sufficient memory for 70 sets of data, which (depending on the number of separate flights during a given period) will be sufficient for of the order of 7 days' worth of data.

It will be seen that for a 7 hour flight, there will be a first reading on the ground, a second reading 30 minutes after take-off, third and fourth readings in flight, and then a final and fifth reading 30 minutes after coming to a stop after landing. The readings having been systematically taken, and recorded, for all tires at various set times, both on the ground and at regular intervals during flight provides better and richer data than could be provided by means of manually measuring and recording tire pressures on the ground before and after flight. Trends in tire pressure of one or more tires can be monitored. Differences between tire pressures of tires that are in very similar, steady-state, conditions (when in flight) can be more readily identified.

Data recorded over several flights may be recorded on the memory unit. Data is wirelessly downloaded from the sensor by means of a handheld device 140 (i.e. not on the aircraft) when the aircraft is on the ground. One device may be able to download data from many sensors at substantially the same time, without needing to walk round to each wheel. Such data can then be used to monitor tire pressures over time in an accurate and controlled manner, without the need of an on-aircraft tire pressure monitoring system such as TPIS ("Tire Pressure Indicating System"). The control unit 128 monitors periodically for a request, from such a device 140, for a data upload to the device 140. Communication between the control unit 128 and the device 140 is encrypted using standard encryption techniques. Security key data is held on the control unit 128 for this purpose. When such a handheld device downloads data from the memory of the smart sensor device, the handheld unit compares the reference pressure with the actual pressure and if the actual pressure (or the trend in pressure reduction over time) is suggestive that the tire is, or soon will be, underinflated a warning message will appear. The tire may then be inflated manually. The handheld unit may also be able, by analysing the historical pressure measurements, recommend replacing a tire or provide an indication of the health of the tire. The tire may be replaced on recommendation of the handheld unit.

Figure 5:
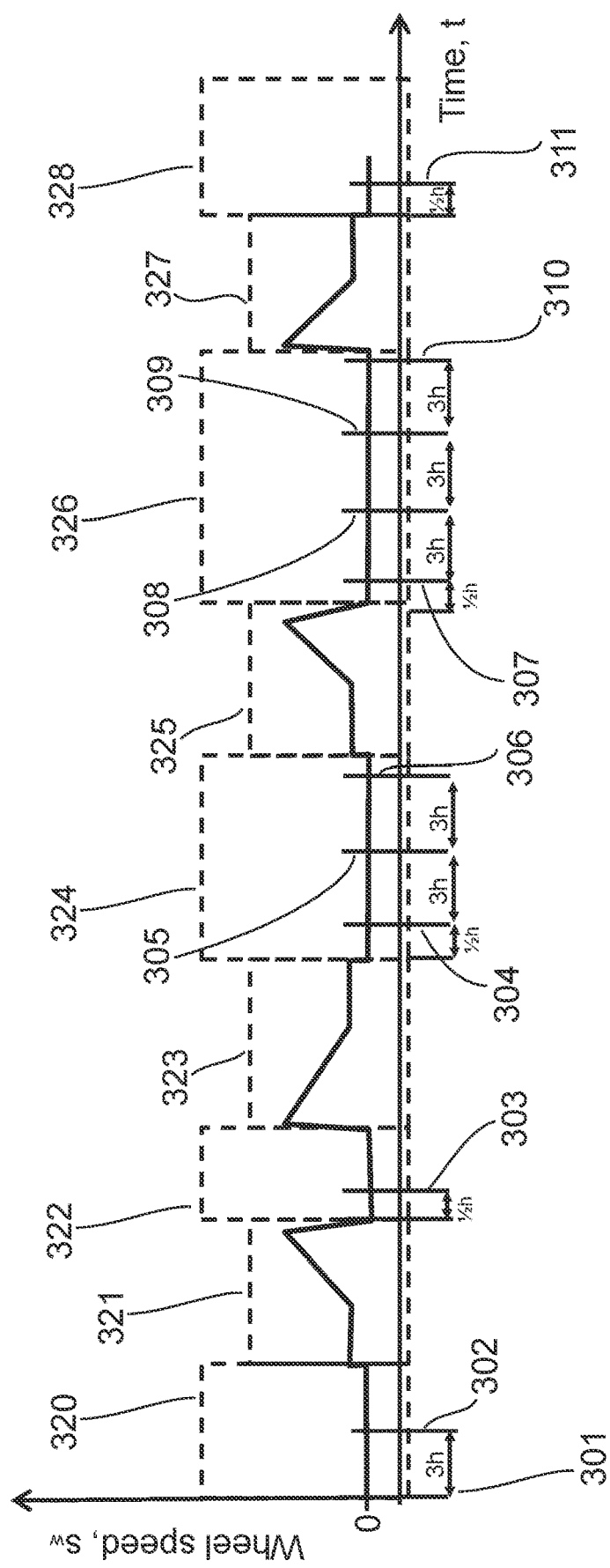
FIG. 5 is a graph (not to scale) showing the timing of tire pressure measurements in an example method of the second embodiment of the invention.

FIG. 5 is a graph showing the times at which measurements are made when performing the method of the second embodiment, using the example of two successive flights. The vertical axis represents wheel speed, $s_w$. The horizontal axis represents time, t. The graph is not to scale and parts of the graph have been exaggerated and shifted to illustrate the various stages of operation (for example the vertical position on the graph representing the speed of the wheels when not rotating has been shifted upwards from the horizontal axis). A first set of readings are taken (time 301) with the aircraft stationary on the ground (region 320). After 3 hours ("3 h") a second set of readings are taken (time 302). Then wheel movement is detected, suggesting taxiing and take-off (region 321). 30 minutes ("½ h") after the wheels stop moving, a third set of readings are taken (time 303) with the aircraft in flight (region 322). Then wheel movement is detected, suggesting landing and taxiing (region 323). 30 minutes after the wheels stop moving, a fourth set of readings are taken (time 304) with the aircraft stationary on the ground (region 324). 3 hours and 6 hours later, fifth and sixth sets of readings are taken (times 305 and 306, respectively), with the aircraft remaining stationary on the ground. Then wheel movement is detected again, suggesting taxiing and take-off again (region 325). 30 minutes after the wheels stop moving, a seventh set of readings are taken (time 307) with the aircraft in flight (region 326). 3 hours, 6 hours and 9 hours later, eighth, ninth and tenth sets of readings are taken (times 308, 309 and 310, respectively) with the aircraft in flight. Then wheel movement is detected, suggesting landing and taxiing (region 327). 30 minutes after the wheels stop moving, an eleventh set of readings are taken (time 311) with the aircraft stationary on the ground (region 328).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In certain embodiments, the control unit may store only a normalised pressure reading that adjusts the measured pressure in view of the measured temperature to yield a value of the expected pressure at a common reference temperature. Such a temperature-normalised pressure reading, allows a comparison between pressure readings taken at different temperatures. The control unit may also adjust pressure readings to take into account whether the aircraft is on the ground with the weight on the wheels, or in flight. When the aircraft is in the air, the pressure in the unloaded tires reduces by about 4%. If all such data is recorded by the control unit and then transmitted (uploaded) to a different device then such normalisation can be performed by means of processing the data later. Such processing of the data can include processing the data from multiple sensors together.

Embodiments of the invention have benefit in respect of aircraft that are provided with an integrated tire pressure indicating system. For example, such embodiments allow maintenance crew to ascertain detailed tire pressure data quickly and easily and without needing to enter the aircraft.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tire pressure sensor device for a wheel of an aircraft, wherein the tire pressure sensor device comprises:
    a housing,
    a pressure sensor configured to measure an internal pressure of a tire,
    a temperature sensor configured to measure a temperature local to the tire,
    a memory unit local to the tire configured to store data, and
    a control unit local to the tire arranged to record in the memory unit data in respect of multiple readings over time,
    wherein the housing accommodates at least the control unit and the memory unit,
    wherein the data stored in the memory unit for each of the readings includes an indication of a time of the reading, an actual pressure as measured by the pressure sensor, and a temperature as measured by the temperature sensor,
    wherein the memory unit includes an indication of a reference tire pressure for the tire, wherein the reference pressure is an expected tire pressure for the tire at a given temperature,
    wherein the memory unit is configured to be read by a handheld device arranged to compare the reference pressure with the actual pressure and to indicate whether the actual pressure is suggestive that the tire is, or soon will be, underinflated, and wherein the control unit is arranged to record the data when the wheel is not spinning.

2. The tire pressure sensor device according to claim 1, further including a communication module facilitating secure wireless communication with the handheld device.

3. The tire pressure sensor device according to claim 1, wherein the tire pressure sensor device includes a motion sensor, and wherein the control unit is configured to detect with the use of the motion sensor at least one of (a) whether the aircraft is in flight, and (b) whether the aircraft is on the ground.

4. The tire pressure sensor device according to claim 1, arranged such that the control unit records in the memory unit both data relating to a first reading of the multiple readings taken from the pressure sensor and the temperature sensor when the aircraft is on the ground and data relating to a second reading of the multiple readings taken from the pressure sensor and the temperature sensor when the aircraft is in flight.

5. The tire pressure sensor device according to claim 4, arranged such that the data so recorded for each of the first and second readings includes an indication of whether the aircraft is on the ground or an indication of whether the aircraft is in flight.

6. The tire pressure sensor device according claim 1, wherein the housing accommodates:
at least a part of the pressure sensor,
at least a part of the temperature sensor, and
a local source of electric power.

7. The tire pressure sensor device according to claim 1, wherein the control unit is arranged to record the data a pre-determined time period after which the wheel has stopped spinning.

8. The tire pressure sensor of claim 1, wherein the reference tire pressure correlates to a given temperature, and the control unit is configured to normalize a measured pressure value of the internal pressure of the tire provided by the pressure sensor using the measured temperature corresponding to the measured pressure value, wherein the normalized measured pressure value is the actual pressure as measured by the pressure sensor, and the handheld unit is configured to compare the reference pressure to the normalized measured pressure valve and use the comparison to indicate whether the normalized measured pressure value is suggestive that the tire is, or soon will be, under inflated.

9. The tire pressure device of claim 1, wherein the handheld device is configured to indicate when the tire will soon be underinflated based on the comparison of the reference pressure and the actual pressure and a trend in pressure reduction for each of a plurality of the readings over time.

10. A system for monitoring aircraft tire pressures, the system comprising:
a tire pressure sensor device for a wheel of an aircraft, wherein the tire pressure sensor device comprises:
a housing,
a pressure sensor configured to measure an internal pressure of a tire on the wheel,
a temperature sensor configured to measure a temperature local to the tire,
a memory unit local to the tire configured to store data,
a control unit local to the tire arranged to record in the memory unit data in respect of multiple readings over time, wherein the control unit records the data when the wheel is not spinning, and
a communications module configured for wireless communication;
wherein the housing accommodates at least the control unit and the memory unit, and
wherein the data so recorded for each of the multiple readings includes an indication of a time of the reading, an actual pressure as measured by the pressure sensor, and a temperature as measured by the temperature sensor, and
wherein the memory unit includes an indication of a reference tire pressure for the tire, wherein the reference pressure is an expected tire pressure for the tire at a given temperature; and
a handheld device configured for wireless communication with the tire pressure sensor device to download the data from the memory unit, to compare the reference pressure with the actual pressure, determine at least one of whether gas should be added to the tire based on the comparison and whether the tire should be replaced based on the comparison, and to indicate whether the gas should be added to the tire or that the tire should be replaced based on the determination.

11. The system of claim 10, comprising a plurality of the tire pressure sensor devices each of which is configured to measure the internal pressure of a different tire of the aircraft, wherein the handheld device is configured to download data from the memory unit of each of the tire pressure device at substantially at the same time.

12. The system of claim 10, wherein wireless communication between the tire pressure sensor device and the handheld device is encrypted.

13. The system of claim 10, wherein the reference tire pressure correlates to a given temperature, and the control unit is configured to normalize a measured pressure value of the internal pressure of the tire provided by the pressure sensor using the measured temperature corresponding to the measured pressure value, wherein the normalized measured pressure value is the actual pressure as measured by the pressure sensor, and the handheld unit is configured to compare the reference pressure to the normalized measured pressure valve and use the comparison to indicate whether the normalized measured pressure value is suggestive that the tire is, or soon will be, under inflated.

14. The system of claim 10, wherein the handheld device is configured to determine both whether the gas should be added to the tire based on the comparison and whether the tire should be replaced based on the comparison.

15. A method of monitoring the pressure of a tire on an aircraft comprising:
a control unit causing a measurement to be taken of actual tire pressure and of an associated temperature local to the tire,
the control unit recording, in a memory unit, data including an indication of the time at which the measurement is taken, an indication of the actual tire pressure and an indication of the associated temperature, wherein the recording by the control unit of the data is performed when a wheel to which the tire is attached is not spinning,
the control unit recording, in the memory unit, an indication of a reference tire pressure for the tire, wherein the reference pressure is an expected tire pressure for the tire at a given temperature,
reading, using a handheld device external to the tire pressure sensor device, the data including the indication of the time at which the measurement is taken, the indication of the actual tire pressure and the indication of the temperature, and the indication of the reference tire pressure, comparing, using the handheld device, the reference pressure with the actual pressure, determining, based at least on the comparison, whether gas should be added to the tire or whether the tire should be replaced using the handheld device; and indicating by the handheld device that gas should be added to the tire or the tire should replaced based on the determination.

16. The method according to claim 15, wherein the method comprises the control unit causing multiple measurements to be taken, at least one measurement taken when the aircraft is on the ground, and at least one further measurement taken when the aircraft is in flight.

17. The method according to claim 15, wherein the method comprises the control unit recording the data a pre-determined time period after which the wheel has stopped spinning.

18. The method according to claim 15, wherein the control unit is mounted to a wheel which includes the tire.

19. The method of claim 15, further comprising the control unit normalizing the measurement of the actual tire pressure using the associated temperature corresponding to the actual tire pressure, wherein the normalized measurement of the actual tire pressure is the indication of the actual tire pressure compared with the reference pressure.

20. The method of claim 15, wherein the step of determining includes determining, based at least on the comparison, both whether the gas should be added to the tire and whether the tire should be replaced using the handheld device.

* * * * *